US010956372B2

(12) United States Patent
Vedre et al.

(10) Patent No.: US 10,956,372 B2
(45) Date of Patent: Mar. 23, 2021

(54) IMAGE CAPTURING AND PROCESSING FOR LEGACY FORMAT INTEGRATION (71) Applicant: BANK OF AMERICA CORPORATION, Charlotte, NC (US)

(72) Inventors: Uday Reddy Vedre, Charlotte, NC (US); Nishant Pushkar, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 242 days.

(21) Appl. No.: 15/684,432

(22) Filed: Aug. 23, 2017

(65) Prior Publication Data
US 2019/0065522 A1 Feb. 28, 2019

(51) Int. Cl.
*G06F 16/178* (2019.01)
*G06F 40/205* (2020.01)
*G06F 16/84* (2019.01)
*G06F 16/583* (2019.01)

(52) U.S. Cl.
CPC ...... *G06F 16/1794* (2019.01); *G06F 16/5838* (2019.01); *G06F 16/86* (2019.01); *G06F 40/205* (2020.01)

(58) Field of Classification Search
CPC .. G06F 16/1794; G06F 16/5838; G06F 16/86; G06F 17/2705; G06F 40/205; G06F 16/5846
See application file for complete search history.

(56) References Cited

U.S. PATENT DOCUMENTS

| 4,696,003 | A  | 9/1987  | Kerr et al.     |
| 5,495,581 | A  | 2/1996  | Tsai            |
| 5,666,293 | A  | 9/1997  | Metz et al.     |
| 5,768,539 | A  | 6/1998  | Metz et al.     |
| 5,838,458 | A  | 11/1998 | Tsai            |
| 5,870,725 | A  | 2/1999  | Bellinger et al.|
| 5,895,455 | A  | 4/1999  | Bellinger et al.|
| 6,771,323 | B1 | 8/2004  | Dean et al.     |
| 6,825,846 | B2 | 11/2004 | Mondal          |
| 7,594,169 | B2 | 9/2009  | Goldman         |
| 7,698,398 | B1 | 4/2010  | Lai             |

(Continued)

FOREIGN PATENT DOCUMENTS

CN          1588302 A          3/2005

*Primary Examiner* — Robert W Beausoliel, Jr.
*Assistant Examiner* — Muhammad Solaiman Bhuyan
(74) *Attorney, Agent, or Firm* — Michael A. Springs; Moore & Van Allen PLLC; R. W. McCord Rayburn (57) ABSTRACT Embodiments of the invention are directed to providing a proprietary file integration system for converting files in a proprietary format useable only by a legacy application or system to a new, useable file format to ensure continued access and use of the files. The invention comprises a nonconventional use of existing systems and modules of a file validation tool by improving and altering its core functions to additionally transform the proprietary files to the new, useable format. The invention extracts the file path from a data archive to open the file before capturing an image of the file, converting the image to a new, useable format, and storing the file for later access and use in the new format. Additionally, the invention can process the file in its new format to automatically generate a searchable index of the file for ease of user discovery and access.

20 Claims, 3 Drawing Sheets (56) References Cited

U.S. PATENT DOCUMENTS

| | | | |
|---|---|---|---|
| 8,589,348 B2 | 11/2013 | Tobin et al. | |
| 9,183,317 B1 | 11/2015 | Cappiello et al. | |
| 10,262,003 B2* | 4/2019 | Kottomtharayil | G06F 1/3212 |
| 2001/0039552 A1 | 11/2001 | Killi et al. | |
| 2002/0036694 A1 | 3/2002 | Merril | |
| 2003/0043397 A1* | 3/2003 | Kaltenecker | G06F 3/1206 |
| | | | 358/1.13 |
| 2004/0222995 A1 | 11/2004 | Colle | |
| 2005/0063575 A1 | 3/2005 | Ma et al. | |
| 2005/0246433 A1 | 11/2005 | Carrigan et al. | |
| 2006/0036941 A1 | 2/2006 | Neil | |
| 2006/0218482 A1 | 9/2006 | Ralston et al. | |
| 2009/0249284 A1 | 10/2009 | Antosz et al. | |
| 2010/0034470 A1* | 2/2010 | Valencia-Campo | |
| | | | G06F 16/5838 |
| | | | 382/218 |
| 2012/0089562 A1 | 4/2012 | Deremigio et al. | |
| 2013/0013671 A1 | 1/2013 | Relan et al. | |
| 2013/0262386 A1* | 10/2013 | Kottomtharayil | G06F 1/3234 |
| | | | 707/635 |
| 2013/0275383 A1* | 10/2013 | McLarty | G06Q 10/107 |
| | | | 707/663 |
| 2013/0346453 A1* | 12/2013 | Procopio | G06F 16/211 |
| | | | 707/809 |
| 2014/0222872 A1* | 8/2014 | Rambo | G06F 16/23 |
| | | | 707/803 |
| 2016/0063532 A1* | 3/2016 | Loeb | G06Q 30/0234 |
| | | | 705/14.25 |
| 2016/0366294 A1* | 12/2016 | Uroskin | H04N 1/00503 |

* cited by examiner

IMAGE CAPTURING AND PROCESSING FOR LEGACY FORMAT INTEGRATION

BACKGROUND

As technology is improved and older devices and applications lose support or are decommissioned, users of said systems and applications tend to upgrade to new computer hardware and software to replace the old, existing systems either out of desire or necessity. Many systems and applications utilize proprietary file formats unique to the specific architecture of said systems and applications for the storage of files and data. However, without access to the required program associated with the specific architecture, the files and data can become un-viewable and inaccessible. As many entities need to store and maintain sometimes tens of thousands of old files, records, and data spanning years for either future reference or to comply with required regulations, a tool for transitioning and integrating old, legacy file formats to new or alternative existing systems is required.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a system, computer program product, and computer-implemented method for integration of legacy file formats.

The invention may be exampled by a system which defines a specific embodiment of the invention. The system typically comprises a memory device comprising a file validation module; a communication device; and a processing device operatively coupled to the memory device and the communication device, wherein the processing device is configured to execute the file validation module to: extract a file path of a first file from a data archive, wherein the first file has a proprietary file format; based on extracting the file path of the first file from the data archive, open the first file via the file path; capture an image of the first file; and export the image of the first file to a database.

In some embodiments of the invention, the system may further comprise a display device operatively coupled to the processing device for displaying the first file, wherein the image of the first file is a screenshot captured on the display device.

In some embodiments of the invention, the file validation module is further configured to: extract one or more additional file paths of one or more additional files from the data archive; and based on extracting the one or more additional file paths from the data archive, open the one or more additional files; capture images of the one or more additional files; and export the images of the one or more additional files to the database.

In some embodiments of the invention, the first file and the one or more additional files are simultaneously processed in bulk.

In some embodiments of the invention, extracting file path further comprises extracting the file path from a link stored in a table.

In some embodiments of the invention, exporting the image of the first file to a database further comprises uploading the image of the first file to a network storage location.

In some embodiments of the invention, exporting the image of the first file in the database further comprises converting unstructured data of the image to structured, searchable data fields.

In some embodiments of the invention, converting the unstructured data of the image to the structured, searchable data fields further comprises: scanning the image of the first file for one or more fields; extracting the one or more fields from the image of the first file; and storing the one or more fields extracted from the image of the first file.

In some embodiments of the invention, storing the one or more fields extracted from the image of the first file further comprises: parsing the one or more fields extracted from the image of the first file; and based on parsing the one or more fields extracted from the image of the first file, generating a searchable index of the first file, wherein the searchable index of the first file comprises the one or more fields.

In some embodiments of the invention, parsing the one or more fields extracted from the image of the first file further comprises validating the one or more fields.

In some embodiments of the invention, exporting the image of the first file further comprises converting the first file to a PDF and/or spreadsheet format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

A "user" as used herein may refer to any entity or individual associated with the file format integration system. In some embodiments, a user may be a computing device user, a mobile device application user, a financial institution customer (e.g., an account holder or a person who has an account (e.g., banking account, credit account, or the like)), a system operator, database manager, and/or employee of an entity. In some embodiments, identities of an individual may include online handles, usernames, identification numbers, aliases, family names, maiden names, nicknames, or the like. In some embodiments, the user may be an individual or an organization (i.e., a charity, business, company, governing body, or the like).

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. The user device may be used by the user to access the system directly or through an application, online portal, internet browser, virtual private network, or the like. The user device may be a computer device within a network of connected computer devices that share one or more network storage locations.

As used herein, the term "resource" may be used to refer to elements of one or more computing devices, networks, or the like available to be used in the execution of tasks or processes. A resource may include processor, memory, or network bandwidth and/or power used for the execution of tasks or processes. A resource may be used to refer to available processing, memory, and/or network bandwidth and/or power of an individual computing device as well a plurality of computing devices that may operate as a collective for the execution of one or more tasks (i.e., nodes of a distributed computing cluster).

In accordance with embodiments of the invention, the term "entity" may be used to include any organization that may interact with the file format integration system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more devices, a transmission of a requested task, or the like.

Applications and systems (e.g., reporting tool software) can be designed to use unique or proprietary file formats during normal operation, wherein files or data processed and saved using said applications or systems are typically stored and maintained in the proprietary format. This requires a user of the application or system to subscribe to or to have present access and connection to the application or systems to access the stored files or data. In some cases, possibly years of the user's files and data may be stored in a proprietary file format only useable by the old application. This presents a challenge if the user (e.g., a company, bank, etc.) decides to instead employ a different application to complete the tasks previously performed by the older application or system (i.e., change service provider). A user may wish to change application service providers for various reasons such as a more attractive pricing structure, better compatibility with internal infrastructure and systems, more attractive software features, or the like. In some cases, a user may be forced to employ a new application if an older, legacy application loses support or is decommissioned and no longer offered as a product or service.

In a specific example of where these complications may pose serious issues, a financial misappropriation reporting division of a financial entity may generate and process over approximately 30,000 reports in a single year with hundreds of different types of reports. Furthermore, to comply with federal regulations, not only does 12 months of data need to be made available to regulators, but reports must be readily viewable if any questions should arise from a compliance point of view.

Therefore, to overcome the aforementioned technical challenges, a system and method for converting and integrating legacy files from a proprietary file format to a new, useable file format is necessary to ensure continued access to potentially vital files and data.

The present invention solves the previously discussed technical problems by providing a proprietary file integration system for converting files in a proprietary format useable only by a legacy application or system to a new, widely useable file format (e.g., PDF, .csv, .txt, or the like) to ensure continued access and use of the files. Generally, the invention comprises a nonconventional use of existing systems and modules of a file validation tool by improving and altering its core functions to additionally transform the proprietary files to the new, useable format. The invention first extracts the file path from a data archive to open the file before capturing an image of the file, converting the image to a new, useable format, and storing the file for later access and use in the new format. Additionally, the invention can process the file in its new format to automatically generate a searchable index of the file for ease of user discovery and access. In some embodiments, the invention may convert large, proprietary files into a smaller portable document format (PDF) or spreadsheet (e.g., .csv) allowing for the previously cumbersome files (which could prove taxing on computer hardware resources to archive, open, and process) to be easily opened and manipulated by a wide range of computing hardware by requiring fewer resources (i.e., processor, memory, or network bandwidth and/or power) for operation and execution of tasks and processes.

Figure 1:
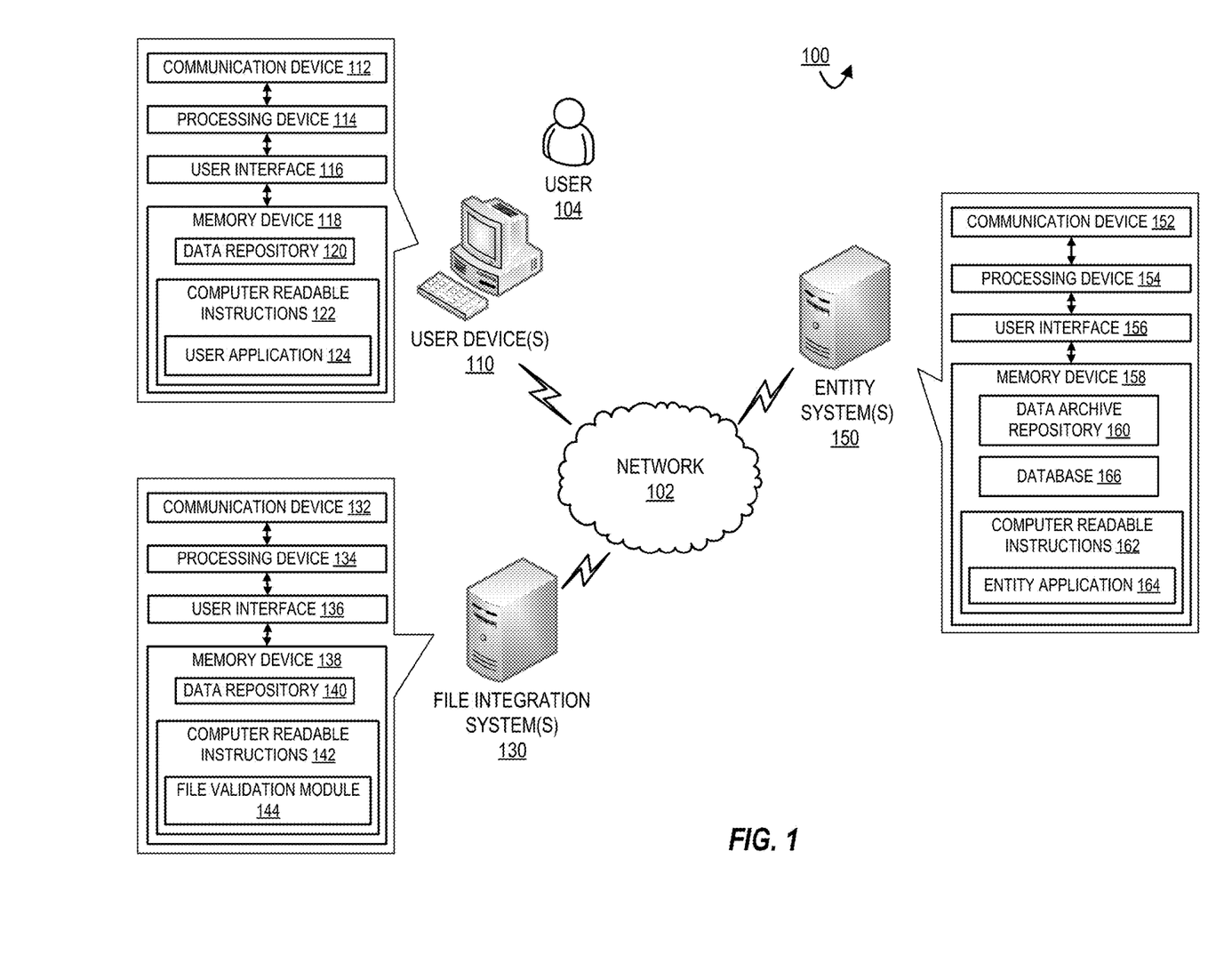
FIG. 1 provides a file format integration system and environment, in accordance with an embodiment of the invention.

FIG. 1 provides a block diagram illustrating a file format integration system and environment 100, in accordance with an embodiment of the invention. The environment 100 includes a user device 110 associated and/or used with authorization of a user 104, a file integration system 130, and an entity system 150. It should be understood, that within the environment 100 there may be more than one of any of the components or systems described or that one or more of components or systems may be embodied as a single device.

As used herein, a "processing device," such as the processing devices 114, 134, and 154 generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" such as the user interfaces 116, 136, and 156, generally includes a plurality of interface devices and/or software that allow a user to input commands and/or data to direct the processing device to execute instructions or tasks. For example, the user interfaces presented in FIG. 1 may include a graphical user interface (GUI) or an interface to input computer-executable instructions that direct the processing device to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more customers.

As used herein, a "memory device" such as memory devices 118, 138, and 158, generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication device" generally includes a modem, server, transceiver, and/or other device for communicating with other devices on a network, and/or a user interface for communicating with one or more customers. Referring again to FIG. 1, the communication devices 112, 132, and 152 comprise communication interfaces having one or more devices configured to communicate with one or more other devices on a network, such as a mobile device, a personal computing device, a server, a distributed computing cluster, third party systems, and/or the like. The processing device is configured to use the network communication device to transmit and/or receive data and/or commands to and/or from the other devices connected to the network. Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

The user device 110 includes a communication device 112 communicably coupled with a processing device 114, which is also communicably coupled with a memory device 118. In some embodiments, the communication device 112 may also comprise a GPS transceiver capable of determining a geographic location associated with the user device 110. The processing device 114 is configured to control the communication device 112 such that the user device 110 communicates across the network 102 with one or more other systems. The processing device 114 is also configured to access the memory device 118 in order to read the computer readable instructions 122, which in some embodiments includes a user application 124. The user application 124 allows for communication of the user device 110 with the other systems and devices within the environment 100 such as the file integration system 130 and/or entity system 150. The user application 124 allows the user 104 to receive information transmitted as well as input information requested by the other systems and communicate with and request the execution of tasks from a file integration system, application or module; one or more third parties; and/or other entities. In some embodiments, the user application 124 further allows the user to interact with manipulate the user application 124 via the user device 110 and the user interface 116. The memory device 118 also includes a data repository 120 or database for storing pieces of data or files that can be accessed by the processing device 114.

The file integration system 130 includes a communication device 132 communicably coupled with a processing device 134, which is also communicably coupled with a memory device 138. The processing device 134 is configured to control the communication device 122 such that the file integration system 130 communicates across the network 102 with one or more other systems. The processing device 134 is also configured to access the memory device 138 in order to read the computer readable instructions 142, which in some embodiments includes a file validation module 144 or application. The file validation module 144 allows for communication with the other systems and devices within the environment 100 such as the user device 110 and/or the entity system 150. The memory device 138 also includes a data repository 140 or database for storing pieces of data or files that can be accessed by the processing device 134. In some embodiments, the data repository 140 further comprises a suite of additional applications or built in functions for use by the file integration system. In some embodiments, the distributed computing cluster management system 130 may be part of the user device 110 and/or entity system 150.

The entity system 150 includes a processing device 154 operatively coupled to a network communication device 152 and a memory device 158. The processing device 154 is configured to control the communication device 152 such that the entity system 150 communicates across the network 102 with one or more other systems. The processing device 154 is also configured to access the memory device 158 in order to read the computer readable instructions 162, which in some embodiments includes an entity application 164. The entity application 164 allows for communication with the other systems and devices within the environment 100 such as the user device 110 and/or the file integration system 130. The memory device 158 also includes a data repository 160 or database for storing pieces of data or files that can be accessed by the processing device 154. In some embodiments, the data repository 160 may store one or more archived, legacy files for use with the file integration system described herein.

The user application 124, the file validation module 144, and the entity application 164 are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the file validation module 144 is stored and configured for being accessed by a processing device of the user device 110 connected to the network 102. In various embodiments, the user application 124, the file validation module 144, and the entity application 164 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one or more of the systems discussed above, such as the entity system 150, may be embodied as more than one system and the various components of the system are not collocated, and in various embodiments, there are multiple components performing the functions indicated herein as a single device. For example, in one embodiment, multiple processing devices may perform the functions of the processing device 134 of the file integration system 130 described herein. Furthermore, one or more of the various device and/or systems described herein may be embodied as one or more combined devices and/or systems.

In various embodiments, the user device 110, the file integration system 130, the entity system 150, and/or other systems may perform all or part of a one or more method or process steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Figure 2:
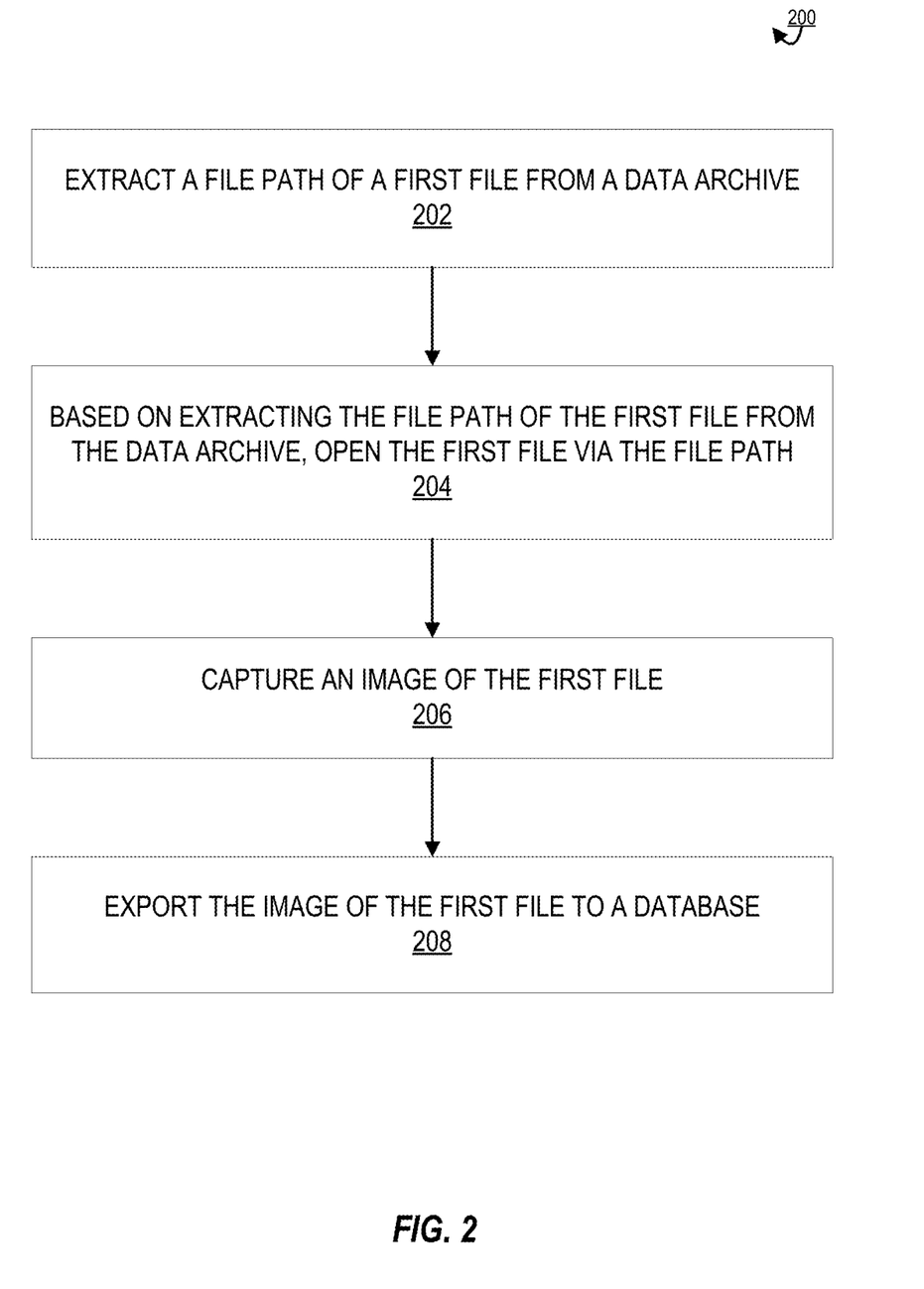
FIG. 2 provides a high-level process flow for legacy file format file extraction, image capture, and integration, in accordance with embodiments of the invention.

FIG. 2 provides a high-level process flow for legacy file format file extraction, image capture, and integration within another system or application, in accordance with embodiments of the invention. Referring now to block 202 of FIG. 2, the system first extracts a file path of a first file from a data archive. The first file may be any type of file having any type of file format to be converted to a second file format for integration into a current, existing system. In some embodiments, the file may be a report generated by a reporting tool (e.g., TIBCO Spotfire). In some embodiments, the file may be a financial report related to financial information or financial misappropriation. In this case, the file may contain sensitive content or information that requires and has additional security, encryption, or the like. The system may first be required to decrypt or positively bypass said security or encryption before accessing the system by, for example, providing a form of authentication information or decrypting the information using a provided key. In some embodiments of the invention, the first file has a proprietary file format that is only accessible and readable by a particular application or system.

Typically, the system is accessed by a user of the file integration system via a user interface on a user device or other device associated with the system. As information processed and stored by the system may be sensitive or requiring security, a user of the system may be required to provide authentication information or credentials via the user interface in order to log in, operate the system, and/or view and manipulate the files stored within.

The data archive used to store the first file and/or other files (converted or unconverted) may be a secure database or datastore within the systems of the system environment 100. The data archive may be maintained by an entity associated with the entity system and/or the file format integration system of FIG. 1. In some embodiments, the data archive may be maintained by a third-party, wherein data is selectively pulled over the network from an external, third-party system for use by the file format integration system.

In some embodiments of the invention, the first file and other files may be extracted and opened by a file validation module for further processing. In some embodiments, the file validation module works in conjunction with a legacy system or application to open and view the file in the proprietary file format. In some embodiments, the file path of one or more files may be extracted and processed in bulk by the system. The system may extract one or more file paths from a database, table, or spreadsheet of indexed file paths, wherein the database or index comprises one or more embedded file path links for navigating within the data archive and opening the files stored within. A user navigates the database, table, or spreadsheet of embedded file paths and click on one or more links to initiate file conversion. Alternatively, the system may automatically navigate and select one or more designated files in bulk. In one example, a user may select one or more individual files within a file collection of a database, table, or spreadsheet for file conversion and integration, wherein after selection, the system automatically extracts one or more file paths of the one or more selected files for access and viewing. In another example, a user may input a list of files to be converted in bulk such as in an uploaded text file or input manually via the user device.

At block 204 of FIG. 2, based on extracting the file path of the first file from the data archive, the system opens the first file via the file path. In some embodiments, the system may open a plurality of files in bulk via one or more file paths. The files are opened by the file validation module or application to allow for access and viewing of the files, which, in some cases, may have proprietary file formats. In some embodiments, the file validation module may operate simultaneously in conjunction with an older, legacy application to open and view proprietary file types associated with the legacy application with the file validation module, wherein the module sends and receives command and data to the older, legacy application while controlling it.

In general, the file validation module is typically a component of a testing tool or application used to validate data. The file validation and testing tool is customized or modified at the code-level with one or more additional, installed modules to alter the operation of the file validation and testing tool in order to allow it to open, view, convert, and store proprietary file types or any type of file into a new, widely useable format. In some embodiments, the file validation module may be a customizable, third party tool or service employed by a user or entity of the file format integration system, typically, for file testing and validation. In some embodiments, the file validation module and testing tool may be an intermediate application or system used for converting a proprietary file type from an older, legacy application to a useable format of a different new application, wherein the file validation module and testing tool are only used for conversion of the file.

At block 206 of FIG. 2, the system captures an image of the first file. The first file is typically displayed by the file validation module within the testing tool as discussed above. The file validation module next captures an image of the first file within the validation and testing tool, the image being stored for future access and additional processing. In some embodiments, capturing an image of the first file may comprise converting the first file to a new file format. In some embodiments, the image of the file captured by the system is a document such as a typed or hand-written text document. In other embodiments, the image of the file captured by the system is a screenshot of the file opened and viewable within the tool. In some embodiment, one or more devices of the system environment may further comprise a display (e.g., a computer monitor, screen, or the like) used for displaying an image of the file generated by a graphics device, wherein the displayed image can be capture via image capture software or applications such as the file validation module described herein.

The system may save and store the captured image as one of more raster, vector, or compound, file formats such as, for example, PDF, joint photographic experts group file format (JPEG), tagged image file format (TIFF), graphics interchange format (GIF), portable network graphics file format (PNG), BMP file format, computer graphics metafile (CGM), and/or other 2D and 3D formats. In other embodiments, the image captured by the system may be video file saved and stored in various file formats such as, for example, audio video interleave (AVI), flash video format (FLV), windows media format (WMV), MPEG-4 part 14 (MP4), and/or the like. In some embodiments, the image captured by the system may be an audio file saved and stored in various file formats such as, for example, MPEG-1 or MPEG-2 audio layer-3 (MP3), waveform audio file format (WAV), advanced audio coding (AAC), free lossless audio codec (FLAC), and/or the like. In some embodiments, the image captured by the device may be a disk image of a disk volume or of an entire data storage device (e.g., a hard drive, optical disc, USB flash drive, a virtual drive, or the like).

In some embodiments, the system may capture images of one or more files received in bulk, wherein the images of the one or more files are captured successively as each received file image is successfully captured by the system. In other embodiments, the images may be captured simultaneously in parallel.

In some embodiments, the system may further validate the scanned and extracted object (i.e., file, data, image, or the like). In some embodiments, the system may automatically validate the data by comparing elements of the old file input into the system to the same elements of the new, converted file. The system validates that the data is the same between the two files (e.g., comparing titles of the documents). In other embodiments, file validation is a manual process, wherein the user compares the old and new files to one another and approves or rejects the new, converted file, wherein upon declining the new file, the converted file is deleted and a second conversion of the old file is triggered.

At block 208 of FIG. 2, the system exports the image of the first file to a database for storage. In this way, the original file has been converted to a new file format that is useable without the older, legacy application. The file can be stored, accessed, and viewed without further need of the legacy application. In some embodiments, capturing the image of the file automatically triggers export of the file to the database. Exporting the first file to the database may further comprise converting the file to a new file format, wherein the file may be stored and saved in the database in the new file format for later access and viewing. For example, the system may first open a file in a first file format, capture an image of the first file with the file validation module, and then export the first file, or the captured image of the first file to the database while converting and saving the first file as a second file format. In some embodiments, the system, module, or tool may open a first file in a first proprietary file format and export the first file in a second proprietary file format that is different from the first proprietary file format, wherein the second proprietary file format is used by a new application replacing an older, legacy application. In some embodiments, the system, module, or tool may export the first file in the new file format directly to another application such as a new application replacing an older, legacy application.

The database used to store and save the files, converted files, and/or captured images of the files is typically a data repository such as a memory, hard disk, server storage system, distributed computing network, or the like. In some embodiments, the storage database is a network storage database or network drive that is accessible across one or more devices of an entity over the network of the entity. In some embodiments, the database may be a virtual drive installed on a virtual machine or server. In other embodiments, the database may refer to a cloud network storage system. In some embodiments, the database may be a temporary storage location used only during operation of the system, wherein the system may further export the file or image from the database to a data archive for permanent, end storage. In some embodiments the data archive is the same data archive from which the first file path and the first file were originally extracted and opened. In other embodiments, the data archives are not the same data archive.

In some embodiments, exporting the image of the first file may trigger the processing of one or more additional files and/or captured images. Upon exporting the converted first file or captured image of the first file, the system may continue to automatically process additional files and/or images. Additional files and/or images may be automatically queued and subsequently processed, exported, and/or converted. In this way, a large number of files may be processed in bulk either successively or in parallel.

Exporting a file or captured image may further comprise attaching additional security measures to the file or captured image. In some embodiments, the system or module may attach or embed one or more security objects or features into the file or captured image. For example, upon converting and saving the file or captured image, the system may attach a security protocol, wherein viewing and/or access of the file is locked, restricted, password protected, non-editable, non-viewable, or the like. In other embodiments, the system may embed a watermark, fingerprint, or the like to the file or image. In some embodiments, the system may encrypt the file or image during conversion and export. In some embodiments, the system may attach, write, or insert tracking and/or logging information or software into the new file to track and/or log user activity and access of the file. In these ways, the file may be further altered by the system to provide additional security to what may be files or images containing sensitive information (e.g., account numbers, personal identification numbers, passwords, and the like).

Figure 3:
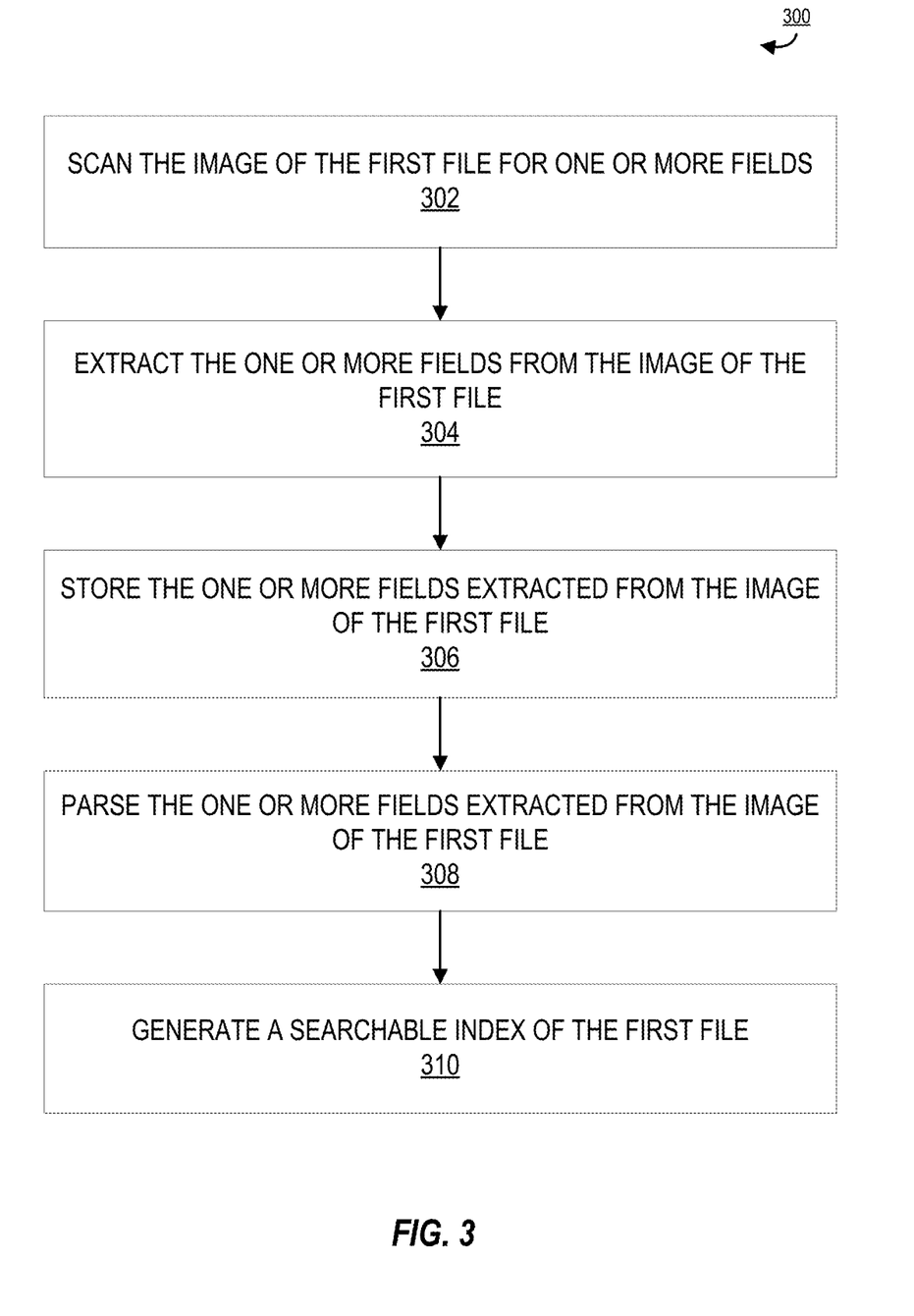
FIG. 3 provides a high-level process for generating a searchable index of a first file or image exported to the database, in accordance with embodiments of the invention.

FIG. 3 provides a high-level process flow for generating a searchable index of the first file or image of the first file exported to the database, in accordance with embodiments of the invention. With respect to FIG. 3, the system would typically first extract a file path of the first file from the data archive, open the first file via the file path, capture and image of the first file, and export the file or image to the database as previously discussed according to blocks 202, 204, 206, and 208 of FIG. 2 respectively. In other embodiments, the searchable file index may be generated before the file is exported to the database.

At block 302 of FIG. 3, to generate the searchable file index, the system first scans the first file or the captured image of the first file for one or more fields and converts the unstructured images or files into structured, searchable data. The one or more fields of the first file or captured image may be text fields (e.g., names, dates, addresses, form identification names, key words, and the like), numerical data entries (e.g., dates, counts, dollar amounts, statistical information, form identification numbers, codes, and the like), images (e.g., logos, seals, signatures, photographs, drawings, recognized facial features, video, and the like), image features (e.g., color, shape, recognizable objects, and the like), and/or file properties (file name, format, size, embedded security, ownership, creation date, edit date, and the like). The system may implement optical character recognition (OCR), facial recognition software, object recognition software, and/or other text and image processing algorithms for identifying text and images of interest from the file, image, or document for use in the searchable index. In some embodiments, the system may further leverage artificial intelligence or machine learning to continually improve field determination and identification during the scanning process. The system may further query the Internet or perform web searches to assist in field recognition during scanning. For example, the system may extract an image of a company logo and perform a web search to match the logo to a specific company name. The results of web searches may be stored by the system to allow for machine learning and improve efficiency of matching similar fields in the future. In other embodiments, the system may transform the file or image into a text file and extract text fields from the transformed file for the index.

At blocks 304 and 306 of FIG. 3, the system proceeds to extract and store the one or more identified and scanned fields from the first file or the image of the first file. In some embodiments, the system stores the one or more extracted fields in the database. In other embodiments, the system may store the one or more extracted fields in a temporary memory during the process of generating the searchable index until the extracted fields can be incorporated and permanently stored as part of the file index. In yet other embodiments, the system may store and integrate the extracted fields within the corresponding newly converted file or image. In this way, the extracted fields used in the index to identify the file or image in searches may be stored integrally with the source file or image.

At block 308 of FIG. 3, the system parses the one or more fields identified, scanned, and extracted from the first file or image of the first file. As previously discussed, the system analyzes and organizes the extracted one or more fields comprising text fields, numerical data entries, images, image features and/or file properties. Additionally, multiple files or images may be processed for indexing as described above either individually or in parallel. For example, the system may receive and process a file comprising a document of a customer's financial records. The system could open and scan the document and potentially identify the customer's identifying information (e.g., name, address, and the like) and financial information (e.g., account numbers, account balances, and the like). The system may further be able to scan the document and recognize and extract an image of a logo of the customer's bank included in the document to identify the bank name. These identified and analyzed fields become searchable identifiers within the file index. A user of the system could search for the account number of the customer and any files or documents containing or related to that account number would be returned by the system to the user within a system user interface.

At block 310 of FIG. 3, based on parsing the one or more fields extracted from the first file or image of the first file, the system generates a searchable index of the first file or image of the first file, wherein the searchable index comprises the one or more fields extracted and stored from the file or image. The searchable index provides structure to the newly stored files and allows for a user to efficiently search for specific files by searching for the one or more identified fields. For example, a user searching through the database of files may search for all files related to misappropriation reports by searching for the keywords "misappropriation report" through the user interface. The database would pull all files at least partially indexed in association with the aforementioned keywords within the index and return the pulled files to the user within the user interface.

The system can further group like or related data or index fields together within the generated index. For example, the system may scan and extract a date of a regular, monthly report from a document and associate the document with the same type of reports corresponding to other months. The index may further display to the user that the report is a monthly report and provide or suggest links to the similar reports from the other months.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein.

Moreover, it should be understood that the process flows described herein include transforming the information sent and/or received from the applications of the different systems (e.g., internally or externally) and/or the devices from one or more data formats into a data format associated with the application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for integration of legacy file formats, the system comprising:
a display device;
a memory device comprising a file validation module;
a communication device; and
a processing device operatively coupled to the memory device and the communication device, wherein the processing device is configured to execute the file validation module to:
extract a file path of a first file from a data archive, wherein the first file has a proprietary file; format, and wherein the first file is encrypted;
based on extracting the file path of the first file from the data archive, decrypt the first file and open the first file via the file path;
display the first file on the display device;
capture an image of the first file;
export the image of the first file to a database, wherein exporting the image of the first file to the database further comprises:
embedding one or more security objects into the image of the first file;
inserting tracking and logging information into the image of the first file, wherein the tracking and logging information tracks and logs user activity and access of the image of the first file;
encrypting the image of the first file; and
converting unstructured data of the image to structured, searchable data fields, and wherein converting the unstructured data further comprises:
scanning the image of the first file for one or more text fields and image fields;
extracting the one or more text fields and image fields from the image of the first file to a temporary memory outside the database; and
storing the one or more text fields and image fields extracted from the image of the first file in the temporary memory, wherein storing the one or more text fields and image fields extracted from the image of the first file further comprises:
parsing the one or more text fields and image fields extracted from the image of the first file; and
based on parsing the one or more text fields and image fields extracted from the image of the first file, generating a searchable index of the first file, wherein generating the searchable index of the first file comprises transferring the one or more text fields and image fields stored in the temporary memory to the searchable index for permanent storage in the database after the searchable index is generated;
group related text fields and image fields within the searchable index; and
display, on the display device and based on a user search and the one or more text fields and image fields within the searchable index, a report and one or more links to other reports having related text fields and image fields.

2. The system of claim 1, wherein the image of the first file is a screenshot captured on the display device.

3. The system of claim 1, wherein the file validation module is further configured to:
extract one or more additional file paths of one or more additional files from the data archive;
based on extracting the one or more additional file paths from the data archive, open the one or more additional files;
capture images of the one or more additional files; and
export the images of the one or more additional files to the database.

4. The system of claim 3, wherein the first file and the one or more additional files are simultaneously processed in bulk.

5. The system of claim 1, wherein extracting the file path further comprises extracting the file path from a link stored in a table.

6. The system of claim 1, wherein exporting the image of the first file to the database further comprises uploading the image of the first file to a network storage location.

7. The system of claim 1, wherein parsing the one or more text fields and image fields extracted from the image of the first file further comprises validating the one or more text fields and image fields.

8. The system of claim 1, wherein exporting the image of the first file further comprises converting the first file to a PDF and a spreadsheet format.

9. The system of claim 1, wherein exporting the image of the first file to the database further comprises embedding a security measure in the image of the first file.

10. The system of claim 9, wherein the security measure comprises embedding logging software into the image of the first file, the logging software being configured track user activity and access of the image of the first file.

11. The system of claim 9, wherein the security measure comprises a security protocol for restricting viewing or editing of the image of the first file.

12. A computer program product for integration of legacy file formats, the computer program product comprising at least one non-transitory computer-readable medium having computer-readable program code portions embodied therein, the computer-readable program code portions comprising:
  an executable portion configured for extracting a file path of a first file from a data archive, wherein the first file has a proprietary file format, and wherein the first file is encrypted;
  an executable portion configured for, based on extracting the file path of the first file from the data archive, decrypting the first file and opening the first file via the file path;
  an executable portion configured for displaying the first file on a display device;
  an executable portion configured for capturing an image of the first file;
  an executable portion configured for exporting the image of the first file to a database, wherein exporting the image of the first file to the database further comprises:
    embedding one or more security objects into the image of the first file;
    inserting tracking and logging information into the image of the first file, wherein the tracking and logging information tracks and logs user activity and access of the image of the first file;
    encrypting the image of the first file; and
    converting unstructured data of the image to structured, searchable data fields, and wherein converting the unstructured data further comprises:
      scanning the image of the first file for one or more text fields and image fields;
      extracting the one or more text fields and image fields from the image of the first file to a temporary memory outside the database; and
      storing the one or more text fields and image fields extracted from the image of the first file in the temporary memory, wherein storing the one or more text fields and image fields extracted from the image of the first file further comprises:
        parsing the one or more text fields and image fields extracted from the image of the first; and
        based on parsing the one or more text fields and image fields extracted from the image of the first file, generating a searchable index of the first file, wherein generating the searchable index of the first file comprises transferring the one or more text fields and image fields stored in the temporary memory to the searchable index for permanent storage in the database after the searchable index is generated;
  an executable portion configured for grouping related text fields and image fields within the searchable index; and
  an executable portion configured for displaying, on the display device and based on a user search and the one or more text fields and image fields within the searchable index, a report and one or more links to other reports having related text fields and image fields.

13. The computer program product of claim 12, wherein the image of the first file is a screenshot captured on the display device.

14. The computer program product of claim 12, wherein the computer-readable program code portions further comprise:
  an executable portion for extracting one or more additional file paths of one or more additional files from the data archive;
  an executable portion for, based on extracting the one or more additional file paths from the data archive, opening the one or more additional files;
  an executable portion for capturing images of the one or more additional files; and
  an executable portion for exporting the images of the one or more additional files to the database.

15. The computer program product of claim 14, wherein the first file and the one or more additional files are simultaneously processed in bulk.

16. The computer program product of claim 12, wherein exporting the image of the first file to the database further comprises uploading the image of the first file to a network storage location.

17. A computer-implemented method for integration of legacy file formats, the method comprising:
  extracting a file path of a first file from a data archive, wherein the first file has a proprietary file format, and wherein the first file is encrypted;
  based on extracting the file path of the first file from the data archive, decrypting the first file and opening the first file via the file path;
  displaying the first file on a display device;
  capturing an image of the first file;
  exporting the image of the first file to a database, wherein exporting the image of the first file to the database further comprises:
    embedding one or more security objects into the image of the first file;
    inserting tracking and logging information into the image of the first file, wherein the tracking and logging information tracks and logs user activity and access of the image of the first file;
    encrypting the image of the first file; and
    converting unstructured data of the image to structured, searchable data fields, and wherein converting the unstructured data further comprises:
      scanning the image of the first file for one or more text fields and image fields;

extracting the one or more text fields and image fields from the image of the first file to a temporary memory outside the database; and storing the one or more text fields and image fields extracted from the image of the first file in the temporary memory, wherein storing the one or more text fields and image fields extracted from the image of the first file further comprises:

parsing the one or more text fields and image fields extracted from the image of the first file; and based on parsing the one or more text fields and image fields extracted from the image of the first file, generating a searchable index of the first file, wherein generating the searchable index of the first file comprises transferring the one or more text fields and image fields stored in the temporary memory to the searchable index for permanent storage in the database after the searchable index is generated;

grouping related text fields and image fields within the searchable index; and displaying, on the display device and based on a user search and the one or more text fields and image fields within the searchable index, a report and one or more links to other reports having related text fields and image fields.

18. The computer-implemented method of claim 17, wherein the image of the first file is a screenshot captured on the display device.

19. The computer-implemented method of claim 17, further comprising:

extracting one or more additional file paths of one or more additional files from the data archive;

based on extracting the one or more additional file paths from the data archive, opening the one or more additional files;

capturing images of the one or more additional files; and exporting the images of the one or more additional files to the database.

20. The computer-implemented method of claim 19, wherein the first file and the one or more additional files are simultaneously processed in bulk.

* * * * *